United States Patent
Flaschenträger et al.

(10) Patent No.: US 9,581,147 B2
(45) Date of Patent: Feb. 28, 2017

(54) ACTUATOR HAVING AT LEAST ONE CONTROL ELEMENT WHICH HAS THERMAL TRANSDUCER MATERIAL

(75) Inventors: David Flaschenträger, Darmstadt (DE); Thorsten Koch, Seeheim-Jugenheim (DE); Björn Seipel, Florstadt (DE); Tobias Melz, Darmstadt (DE)

(73) Assignee: FRAUNHOFER-GESELLSCHAFT ZUR FORDERUNG DER ANGEWANDTEN FORSCHUNG E.V., Munich (DE)

( * ) Notice: Subject to any disclaimer, the term of this patent is extended or adjusted under 35 U.S.C. 154(b) by 211 days.

(21) Appl. No.: 14/342,797

(22) PCT Filed: Sep. 4, 2012

(86) PCT No.: PCT/EP2012/003696
§ 371 (c)(1),
(2), (4) Date: Mar. 28, 2014

(87) PCT Pub. No.: WO2013/034280
PCT Pub. Date: Mar. 14, 2013

(65) Prior Publication Data
US 2014/0298794 A1 Oct. 9, 2014

(30) Foreign Application Priority Data

Sep. 5, 2011 (DE) .......................... 10 2011 112 290

(51) Int. Cl.
*F02G 1/04* (2006.01)
*F03G 7/06* (2006.01)

(52) U.S. Cl.
CPC ............... *F03G 7/065* (2013.01); *F03G 7/06* (2013.01)

(58) Field of Classification Search
CPC ................................... F03G 7/06; F03G 7/065
USPC ..................................................... 60/527–529
See application file for complete search history.

(56) References Cited

U.S. PATENT DOCUMENTS

| 5,588,205 A | 12/1996 | Roane |
|---|---|---|
| 5,608,692 A | 3/1997 | Toda |
| 5,977,685 A | 11/1999 | Kurita et al. |

(Continued)

FOREIGN PATENT DOCUMENTS

DE 91 00 339 U1 4/1991

*Primary Examiner* — Jesse Bogue
(74) *Attorney, Agent, or Firm* — Fitch, Even, Tabin & Flannery LLP

(57) ABSTRACT

The invention is an actuator which includes at least one control element which has thermally activatable transducer material and which, in response to the supply or dissipation of energy, changes from a first shape state into a second shape state, and a mechanical energy storage, which is functionally connected to the control element. When the control element is in the second shape state, it exerts a restoring force on the control element which returns the control element to the first shape state. The mechanical energy storage includes an elastomer body, which at least in some regions is in direct physical and thermal contact with the control element. The elastomer body is connected in a spatially fixed manner to the control element in at least two spatially separated joining regions along the control element.

16 Claims, 3 Drawing Sheets

(56) References Cited

U.S. PATENT DOCUMENTS

| | | | | |
|---|---|---|---|---|
| 6,072,154 | A | * | 6/2000 | Maynard ............... A61B 1/0058 219/209 |
| 6,161,382 | A | * | 12/2000 | Brotz ........................ F03G 7/06 310/307 |
| 6,220,550 | B1 | * | 4/2001 | McKillip, Jr. .......... B64C 13/50 114/144 R |
| 6,545,391 | B1 | | 4/2003 | Su et al. |
| 7,188,473 | B1 | * | 3/2007 | Asada .................. H02N 11/006 310/306 |
| 7,901,524 | B1 | * | 3/2011 | McKnight ............... B29C 53/02 148/563 |
| 2002/0128640 | A1 | * | 9/2002 | Swanson ............ A61B 18/1492 606/32 |
| 2006/0038643 | A1 | * | 2/2006 | Xu .......................... F03G 7/065 335/78 |
| 2010/0212312 | A1 | * | 8/2010 | Rudduck ................ F03G 7/065 60/527 |
| 2011/0083431 | A1 | * | 4/2011 | Mankame ............... F03G 7/065 60/527 |
| 2012/0048839 | A1 | * | 3/2012 | Leary ..................... F03G 7/065 219/200 |

\* cited by examiner

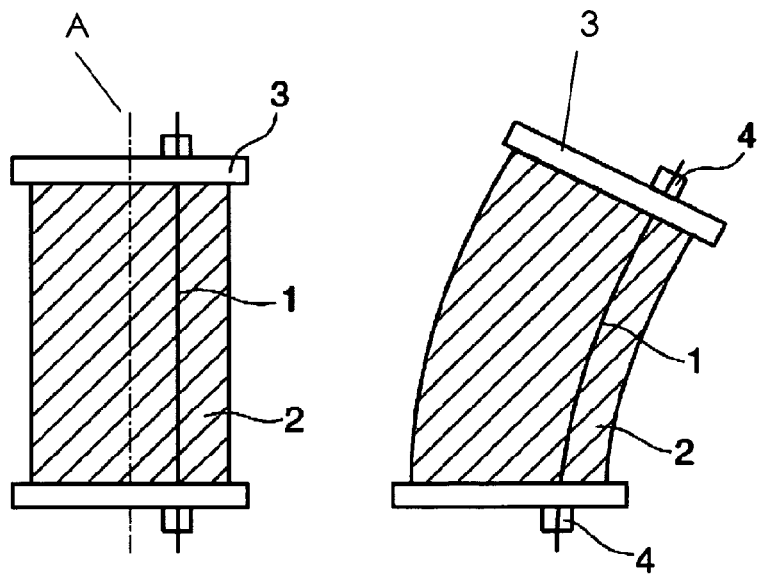
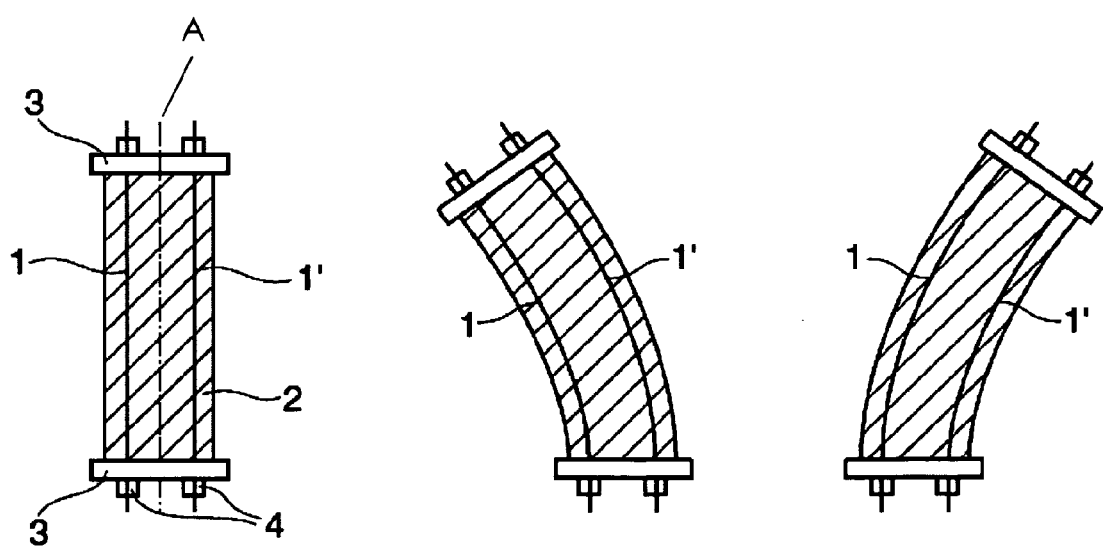
Fig. 3a   Fig. 3b
Fig. 4a   Fig. 4b   Fig. 4c

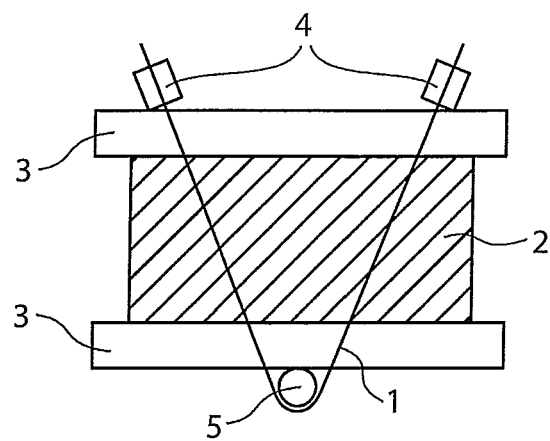
Fig. 5
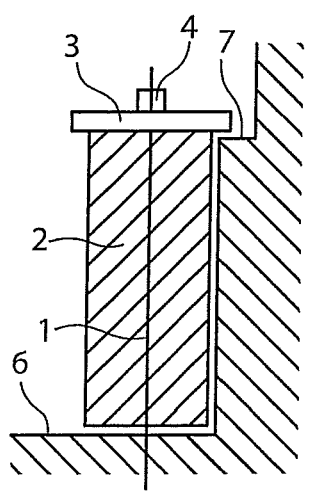 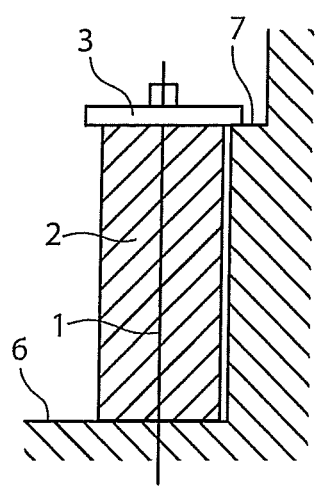 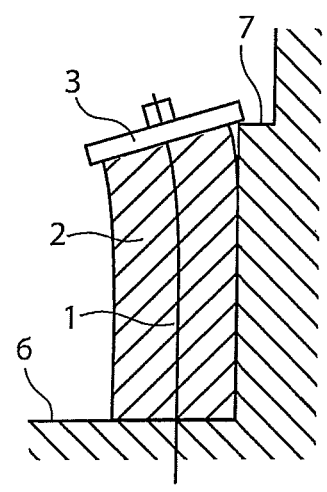
Fig. 6a  Fig. 6b  Fig. 6c

ACTUATOR HAVING AT LEAST ONE CONTROL ELEMENT WHICH HAS THERMAL TRANSDUCER MATERIAL

CROSS REFERENCE TO RELATED APPLICATION

Reference is made to German Application Serial No. DE 10 2011 112 290.0, filed Sep. 5, 2011, which application is incorporated herein by reference in its entirety.

BACKGROUND OF THE INVENTION

Field of the Invention

The invention relates to an actuator having at least one control element which has thermally activatable transducer material. The at least one control element changes from a first shape state into a second shape state. A mechanical energy storage is functionally connected to the at least one control element and when the at least one control element is in the second shape state it exerts a restoring force on the at least one control element which returns the at least one control element to the first shape state.

Description of the Prior Art

Actuators having at least one control element which utilize thermally activatable transducer material are used to perform mechanical actuation in which the control element is to be deflected in a controlled, bidirectional manner along a movement trajectory, which in most cases corresponds to along a linear axis. For a multiplicity of technical, in particular control applications, control elements are used which utilize a shape memory alloy, often in the form of shape memory wires or plates.

Such control elements are generally activated either by the ambient temperature or by artificial thermoelectrical stimulation. In the case of artificial thermoelectrical stimulation, an electrical voltage is applied to the control element including an electrically conductive shape memory alloy, (SMA). The voltage results in a flow of electrical current along the control element producing a resistance-induced ohmic heat, which heats the control element.

As a result of the heating, SMA control elements generally undergo a change in shape, preferably in the form of a shortening or change in size, which is caused by a phase transformation between the martensitic low-temperature phase to the austenitic high-temperature phase. Many of the known shape memory alloys cannot perform any more work once the austenitic high-temperature phase has been achieved. In these cases an automatic reverse deformation once the shape has changed when the shape memory alloy is heated does not occur, even when the temperature is reduced.

In order to be able to perform work again in these cases, the control element must be returned to the starting state, in which an SMA must be cooled and also deformed back to the starting state by means of an external mechanical force. It should be noted that such a restoration of shape induced by a mechanical external force is also used for shape memory actuators which can be activated correspondingly by magnetic fields.

The mechanical restoration of SMA control elements which have been deflected once or deformed once by thermal activation, for example in the form of wires or wire bundles, takes place with the aid of restoring elements functionally connected to the control elements, for example in the form of springs or weights. During the switching process, the control element thus performs mechanical work induced by a change in travel, which is partially used to deform the corresponding restoring element, for example to tension a spring or to displace a weight, for example to lift a weight counter to gravity. During restoration, the mechanical energy stored in this manner is transmitted back to the control element, as a result of which the latter can be transferred to its starting state.

A further possibility for restoring SMA control elements to the starting state can also be achieved with a plurality of SMA control elements entering into alternating functional connections, in which the switching process of an SMA control element causes a corresponding restoration of another SMA control element. Restoring elements in the form of springs and weights can be omitted in this manner.

The prerequisite for complete restoration, which can also be achieved within a short time, of an SMA control element deformed by thermal activation depends critically on the ability to conduct away or dissipate the thermal energy necessary for the single deformation process in the form of heat out of the control element after the switching process.

To support the cooling process, the convection-induced heat removal process is supported in a known per se manner, for example with the aid of an external fan, as a result of which the convective cooling process is greatly enhanced and the cooling speed of the SMA control element can be increased, in order in this manner to allow a faster return to the starting state and thus a faster repeated switching or activation of the control element.

SUMMARY OF THE INVENTION

The invention utilizes an actuator having at least one control element which has thermally activatable transducer material and, as a result of the supply or dissipation of energy, changes from a first shape state into a second shape state, and has a mechanical energy storage, which is functionally connected to the at least one control element. When the at least one control element is in the second shape state, a restoring force is exerted on the at least one control element which returns the at least one control element to the first shape state, in such a manner that the process of returning to the first shape state takes place faster than previously, so that the actuator has faster actuator reaction times, so that the at least one control element can change to and from the first and second shape states in a very short time sequence.

An actuator is formed so that the mechanical energy store has an elastomer body, which at least in some regions, is in direct physical and thermal contact with the at least one control element. The elastomer body is also connected in a spatially fixed manner to the at least one control element at least two spatially separate regions along the at least one control element, so that in the event of a change in shape of the at least one control element, the elastomer body is subjected to a compression or an elongation which generates the restoring force.

The at least one control element described below is entirely made from a thermally activatable transducer material, preferably of a thermally activatable SMA. Of course, control elements having transducer materials which can be activated in different ways are also conceivable. In these cases, the further embodiments of the invention can relate to thermally activatable regions of hybrid control elements.

Control elements of only thermally activatable shape memory alloys can have a wide variety of spatial shapes with the most widespread being wire- or plate-shaped SMA control elements in actuator systems. Regardless of the choice of shape and size of the thermally activatable control elements, the control elements should according to the invention be connected to an elastomer body so that the elastomer body undergoes a change in shape at the same time as the change in shape or change in travel of the control elements, which cause compression or expansion work to be performed on the elastomer body, which is stored as elastic potential energy in the elastomer body. The elastic potential energy stored in the elastomer body in turn generates in the control elements a restoring force directed counter to the direction of travel, which can transfer the control elements back to the starting state.

In order to be able to use the change in shape of the elastomer body initiated by the change in travel of the at least one SMA control element in the most direct manner possible and largely without losses in travel, at least two fasteners are used, which are connected to the at least one control element in each case two spaced apart regions located along the control element which are in addition connected in a fixed manner to the elastomer body which is joined in a form-fitting manner to the at least one control element.

In this manner the fasteners can transmit compression or expansion forces to the elastomer body situated between the two fasteners in the event of a corresponding change in shape of the at least one control element. Specific configurations of the fasteners are explained below in connection with the figures.

The elastomer body which is joined in a form-fitting manner to the control elements has sufficient elasticity owing to its mechanical properties that the elastomer body can follow the thermally activated deformations of the at least one control element permanently and without damage. The heat produced by the electrical operation of the at least one SMA control element can be absorbed directly and dissipated to the environment owing to the direct physical contact between the elastomer body and the at least one control element. Since the elastomer body surrounds the at least one control element in a tight manner, preferably completely, the elastomer body can remove the heat from the control element effectively. In the same manner, in the event of activation initiated by ambient temperature, heat is removed from the SMA control element via the elastomer body surrounding the at least one control element as soon as the ambient temperature falls below the activation temperature.

In a preferred embodiment, for the purpose of improved heat dissipation, the elastomer body is mixed with additional substances or particles which improve heat dissipation, such as boron nitride. Of course, additives such as metal powders, for example iron, copper, aluminium or silver powders, are also suitable. The addition of oxides such as zinc oxide or magnesium oxide are likewise suitable. Fiber fillers such as carbon fibers can also be incorporated in the elastomer body for the purpose of improved heat conduction. The elastomer body can also be mixed with graphite. The above addition of substances, in particular the addition of electrically conductive substances, must be introduced into the elastomer body in a concentration and distribution such that the elastomer body itself does not become electrically conductive, in order to ensure electrical insulation of the elastomer body from the environment in this manner.

To support the heat removal process further, it is advantageous and also conceivable, in combination with or alternatively to the above measures, to provide the elastomer body with at least one cooling channel, through which a cooling medium, such as a cooling liquid, can be conducted.

It is also advantageous to shape the surface of the elastomer body which faces away from the control element and towards the environment in such a manner that it has surface structures which enlarge the surface area of the body and are configured and suited to improving heat exchange via the surface structures. Such surface structures can be selected to be in the form of cooling ribs, as are known from the field of internal combustion engines.

As some of the further exemplary embodiments will show, the elastomer body is also used as a deformation body, which causes the trajectory along which the change in travel of the actuator takes place to be predefined. In particular, if two or more SMA control elements which penetrate the respective elastomer body are used, different spatial deflections of the actuator can be enforced or achieved from the elastic properties of the elastomer body.

BRIEF DESCRIPTION OF THE DRAWINGS

The invention is described below by way of example using exemplary embodiments and with reference to the drawings, without any limitation of the general inventive concept. In the figures:

FIGS. 3 to 6 show alternative configurations of the actuator formed according to the invention.

DETAILED DESCRIPTION OF THE INVENTION

Figure 1:
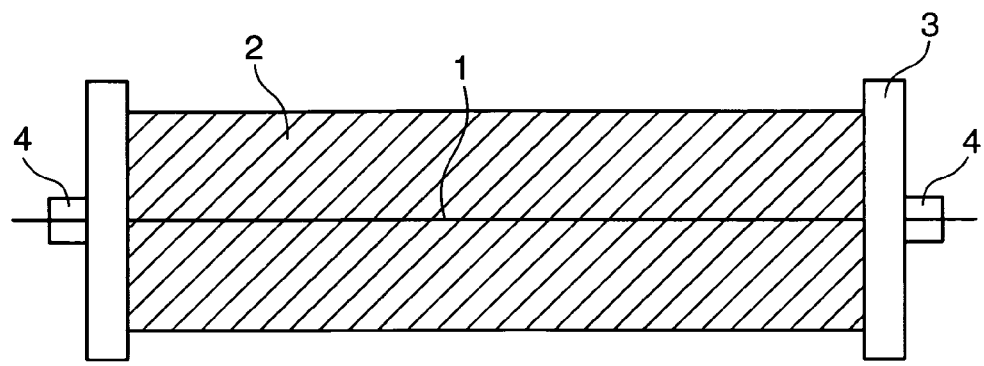
FIG. 1 shows a cross section of an actuator formed according to the invention.

FIG. 1 shows a diagrammatic longitudinal section through an actuator formed according to the invention, which has a wire 1 made from a SMA for producing a change in travel. For the thermal activation of the SMA wire 1, the wire is connected to a suitable electrical current source (not shown). Alternatively, the SMA wire can also be induced to change shape as a result of the ambient temperature exceeding a defined activation temperature.

Along a section of the SMA wire 1, an elastomer body 2 is provided in the form of a solid cylinder through which the SMA wire 1 centrally runs. The SMA wire 1 thus is in direct physical contact with the elastomer body 2, which surrounds the former in a form-fitting manner. On both sides of the elastomer body 2, fasteners 3 in the form of covering elements are provided, which are joined fixedly to the SMA wire 1 and also to the end faces of the elastomer body 2. For the fixed joining of the covering elements 3 to the SMA wire, reference is made to the connection elements 4, which are illustrated in FIGS. 2a and b.

In the event of actuator activation, which takes place in response to a brief supply of current to the SMA wire 1 or by heating the SMA wire 1 by means of the ambient temperature, the SMA wire 1 contracts. Owing to the spatially fixed connection of the covering elements 3 to the wire 1, the covering elements 3 are correspondingly moved together with the wire deformation and for their part compress the elastomer body 2, which is located on both sides between the two covering elements 3 and is correspondingly elastically deformed that is, compressed.

However, if the temperature inside the SMA wire falls again after corresponding activation or cooling of the ambient temperature, a change in structure takes place inside the SMA wire 1 which reduces the rigidity of the SMA wire 1. The compressed elastomer body 2 can thus output its stored mechanical elastic potential or compression energy by relaxing in the form of a restoring force, which transfers the SMA wire 1 to the starting state and acts on both covering elements 3 with mutually opposite force directions.

Figure 2A:
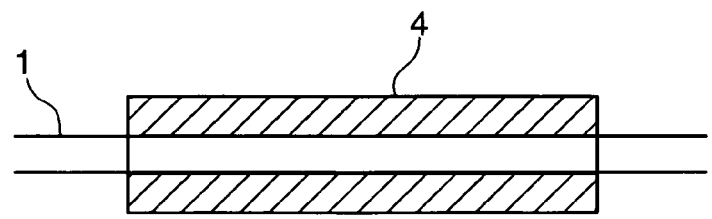
FIGS. 2a and b show fasteners for fixing covering elements along the SMA control element.
Figure 2B:
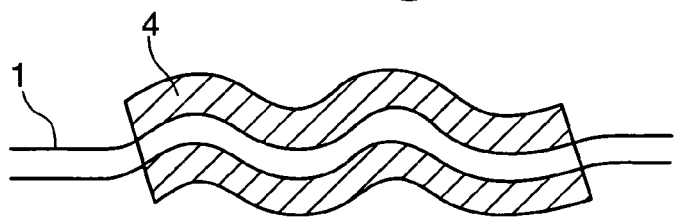

FIGS. 2a and b show a possibility how the covering elements 3 shown in FIG. 1 can each be joined in a spatially fixed manner to the SMA wire 1. Plastically deformable, sleeve-like connection elements 4, which can be guided over the SMA wire 1 and, positioned at any desired point along the wire are used for this. FIG. 2a shows such a sleeve-like connection element 4. In order to carry out permanent fixing preventing movement along the SMA wire 1, the connection element 4 is plastically deformed in the longitudinal direction of the SMA wire 1 with the aid of a suitable crimping tool, so that the connection element 4 is securely joined to the SMA wire 1 by a combination of form-fitting and frictional force.

The plastically deformable connection element 4 illustrated in FIGS. 2a and b is in each case connected fixedly to the SMA wire 1 on one side relative to the covering element 3 according to the position which can be seen in FIG. 1. In the event of a corresponding shortening of the SMA wire 1, both covering elements 3 thus move towards each other owing to in each case a one-sided, fixed connection to the SMA wire 1 which thus compresses the elastomer body 2 situated in between.

In contrast to the central arrangement of the SMA wire 1 along the cylindrical elastomer body 2 in FIG. 1, as a result of which the change in travel of the actuator runs in the longitudinal direction of the SMA wire 1, the SMA wire 1 in the exemplary embodiment according to FIGS. 3a and b is arranged eccentrically to the cylinder axis A of the cylindrical elastomer body 2. In this example, the elastomer body 2 is also connected fixedly to the SMA wire 1 via the covering elements 3 and the connection elements 4.

In the event of a thermally induced activation of the SMA wire 1, which results in a shortening of the wire 1, the actuator according to FIG. 3 lateral pivots as a result of the geometry and elastic deformation properties of the elastomer body 2. The movement trajectory which the actuator follows in the case illustrated in FIG. 3 is thus produced from the eccentric attachment of the SMA wire 1 relative to the axis of symmetry A of the elastomer body 2 and from the shape, size and elastic deformation properties of the elastomer body 2.

To return the thermally activated SMA wire 1 to the starting state, the elastomer body 2 is used, which generates a restoring force which restores the starting state owing to the deformation.

If only one SMA wire 1 is used to change the travel of the actuator, the travel trajectory is predefined in an unchanging manner by the design of the actuator. If, however, two or more SMA wires, which can be thermally activated separately from each other, are provided within a single actuator, individual travel trajectories can be produced. FIG. 4a illustrates an actuator of this type, which provides two separate SMA wires 1 and 1' along an elastomer body 2. The SMA wires 1 and 1' are connected in the same manner to the elastomer body 2 via connection elements 4 and covering elements 3, as is explained in the case example according to FIG. 1. Both SMA wires 1 and 1' are each attached eccentrically to the cylinder axis A of the elastomer body 2. A bidirectional pivoting of the actuator can be achieved depending on the activation of the SMA wires 1 and 1'. In the case example in FIG. 4b, it is assumed that the SMA wire 1 is thermally activated and thus shortened, whereas the SMA wire 1' does not undergo a corresponding activation. In this manner the actuator pivots to the left. In contrast, in case example in FIG. 4c, the SMA wire 1' is thermally activated while the SMA wire 1 remains without activation. The actuator is thereby pivoted to the right. Of course, it is possible to provide more than two such SMA wires inside an elastomer body to achieve multidirectional pivoting of the actuator.

A further exemplary embodiment is illustrated in FIG. 5, which has an SMA wire 1 which penetrates the elastomer body 2 in different spatial directions. In this case, the SMA wire 1 is in each case fixed to an upper covering element 3 by the above-explained connection elements 4. Only a deflection element 5 is attached to the lower covering element 3, around which deflection element the SMA wire 1 is deflected. With this design of the actuator, it is possible, depending on the position of the deflection element 5 relative to the connection elements 4 attached to the covering element 3, to achieve increases in travel.

A further variant for influencing the travel is shown in the sequence diagrams according to FIGS. 6a, b and c. Here the lower end of the elastomer body 2 is connected to a lower supporting face 6, in which the SMA wire 1 is fixed on one side. In the same manner as in the exemplary embodiment according to FIG. 1, the SMA wire 1 runs centrally to the otherwise cylindrical elastomer body 2. Of course, spatial shapes which deviate from the cylindrical shape are also possible to form the elastomer body 2, such as shapes of oval or polygonal cross section.

The upper end of the elastomer body 2 is connected to a covering element 3 and to a connection element 4 which has already been explained. In the event of corresponding activation of the SMA wire 1, the SMA wire is shortened and together with the covering element 3 coming into contact with a lateral counterbearing 7, causing the actuator is bent to the side, at least in the upper region (See FIG. 6b and c). Such mechanical counterbearings 7 can be used to provide externally induced jumps in rigidity, which influence the movement process of the actuator and allow complex control processes in which several partial movements of the same SMA wire 1 can be executed in parallel or sequentially during a switching process.

In the same manner as the application or provision of an externally induced jump in rigidity by use of the counterbearing 7 illustrated in FIG. 6, such jumps in rigidity can also be provided inside the elastomer body 2 so that suitable rigidity regions, which come into contact with each other, are created inside the elastomer body.

The material from which the elastomer body 2 is formed is in principle selected from an electrically non-conductive material so that electrical short circuits can be avoided, using in particular actuators which can be activated electrically.

Typically, elastomer bodies can be produced using a casting process, during which the at least one SMA wire can be inserted into the region of the elastomer body. Alternatively, a place-holder for an appropriate cut-out can be provided during the casting process, so that the SMA wire can be introduced into the elastomer body after the latter has been produced. It is likewise possible to integrate the at least one SMA wire in the elastomer body by means of subsequent drilling or penetration processes.

Particularly suitable materials for the elastomer body are elastomer-like materials based on rubber or silicone. Foamed elements having suitable elastic properties can also be used.

As already mentioned in connection with the exemplary embodiment illustrated in FIG. 6, non-homogeneous rigidity distributions can be carried out within the elastomer body to provide complex actuator deformations, for example by embedding additional rigidity elements inside the elastomer body.

It is also possible to integrate electronic or mechanical components such as sensors, RFID chips, magnetic bodies or the like during the process of producing the elastomer body in order in this manner to carry out monitoring of any type, for example temperature monitoring, identification for protection against plagiarism etc.

LIST OF REFERENCE SYMBOLS

1 Control element, SMA wire
2 Elastomer body
3 Covering element
4 Connection element
5 Deflection element
6 Supporting face
7 Mechanical counterbearing

The invention claimed is:

1. An actuator comprising:
at least one control element including a thermally activatable transducer material which extends in a longitudinal dimension, is responsive to the supply or dissipation of energy, and changes from a first shape state into a second shape state;
a mechanical energy store, which is functionally connected to the at least one control element which in the second shape state exerts on the at least one control element a restoring force which returns the at least one control element to the first shape state;
the mechanical energy store includes an elastomer body which is always in direct physical and thermal contact with the at least one control element regardless of whether the at least one control element is in the first or the second shape state; and
the elastomer body is electrically insulating and is connected in a spatially fixed manner to the at least one control element in at least two spatially separate regions along the control element so that a change in shape of the at least one control element compresses or elongates the elastomer body to generate the restoring force; and wherein
the elastomer body comprises an elastomer material containing at least one additive which increases the thermal conductivity of the elastomer.

2. The actuator according to claim 1, wherein:
the at least one additive is selected from one or more of the following groups of substances:
metal powders comprising iron, copper, aluminium or silver, oxides comprising zinc oxide or magnesium oxide, graphite, fiber fillers comprising carbon fibers, or boron nitride.

3. The actuator according to claim 2, wherein the elastomer body includes:
a body surface facing away from the at least one control element which has surface structures increasing surface area of the elastomer body providing heat exchange via the surface structures.

4. The actuator according to claim 3, wherein:
the control element comprises a shape memory material.

5. The actuator according to claim 2, wherein:
the control element comprises a shape memory material.

6. The actuator according to claim 1, wherein the elastomer body includes:
a body surface facing away from the at least one control element which has surface structures increasing surface area of the elastomer body providing heat exchange via the surface structures.

7. The actuator according to claim 6, wherein:
the control element comprises a shape memory material.

8. The actuator according to claim 1, wherein:
the elastomer body comprises at least one cooling channel; through which cooling medium can be conducted.

9. The actuator according to claim 8, wherein:
the control element comprises a shape memory material.

10. The actuator according to claim 1, wherein:
the control element comprises a shape memory material.

11. The actuator according to claim 1, wherein:
the control element comprises a SMA wire and the elastomer body surrounds and contacts the SMA wire and is held on both sides along the SMA wire between two fasteners which are connected fixedly to the wire.

12. The actuator according to claim 1, wherein:
the elastomer body comprises a shaped body having a longitudinally extension, an upper side and underside, which are opposite each other along the longitudinal extension, a first covering element is joined fixedly to the underside and a second covering element is joined to the upper side of the elastomer body and at least one shape memory wire runs through the elastomer body and is fixedly to both covering elements.

13. The actuator according to claim 12, wherein:
the shaped body has an axis of symmetry running along the longitudinal extension and the at least one wire is attached eccentrically or is offset from the axis of symmetry.

14. The actuator according to claim 1, comprising:
a first covering element joined to the underside and includes a stationary, mechanical counterbearing having a projection extending in a longitudinal direction of the elastomer body and a second covering element joined to the upper side of the elastomer body which contacts the projection during a change in shape and deflects the elastomer body laterally relative to the longitudinal direction.

15. An actuator comprising:
at least one control element including a thermally activatable transducer material which extends in a longitudinal dimension, which is responsive to the supply or dissipation of energy, and changes from a first shape state into a second shape state;
a mechanical energy store, which is functionally connected to the at least one control element which in the second shape state exerts on the at least one control element a restoring force which returns the at least one control element to the first shape state;
the mechanical energy store includes an elastomer body which is always in direct physical and thermal contact with the at least one control element regardless of whether the at least one control element is in the first or the second shape state; and
the elastomer body is electrically insulating and is connected in a spatially fixed manner to the at least one control element in at least two spatially separate regions along the control element so that in a change in shape of the at least one control element compresses or elongates the elastomer body to generate the restoring force, and wherein;
the elastomer body comprises at least one liquid cooling channel through which liquid cooling medium can be conducted.

16. The actuator according to claim 15, wherein:
the control element comprises a shape memory material.

\* \* \* \* \*